Dec. 2, 1958   F. A. WALES   2,862,780
TEA COZY
Filed April 5, 1954
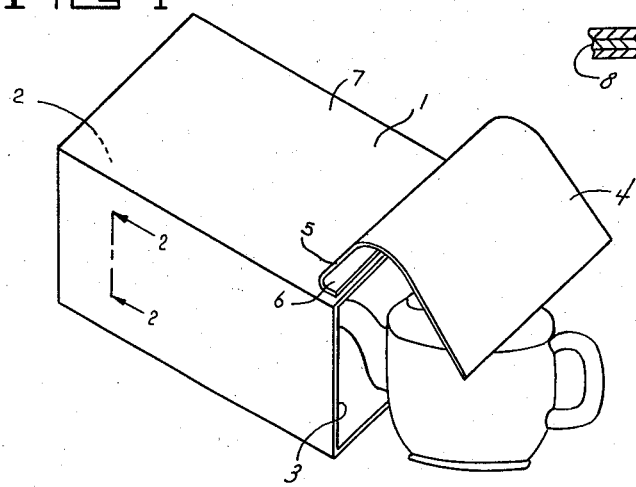
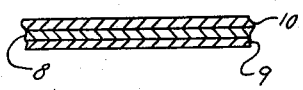
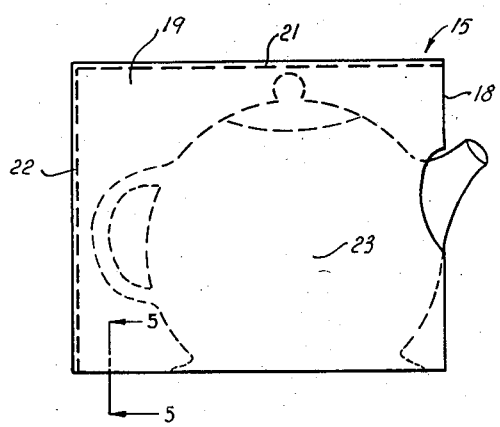
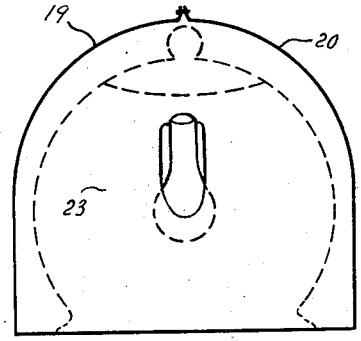
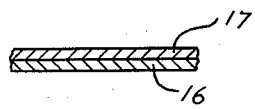
INVENTOR.
FRED A. WALES
BY SMITH, OLSEN & KOTTS
ATTORNEYS United States Patent Office 2,862,780
Patented Dec. 2, 1958

2,862,780

TEA COZY

Fred A. Wales, Detroit, Mich.

Application April 5, 1954, Serial No. 421,146

1 Claim. (Cl. 312—214)

This invention relates to a tea cozy.

Tea as a beverage is ordinarily prepared by pouring boiling water on the tea leaves in a tea pot and allowing the mixture to stand for a period of three to five minutes, after which the tea beverage is ready for drinking. During the standing period the hot water draws tannin and other water soluble ingredients from the tea leaves and into the water solution which is used as the beverage. It is the tannin in tea particularly which gives the basic tea flavor desired by tea drinkers.

The solubility of tannin in water decreases rapidly as the temperature of the water is lowered below two hundred degrees Fahrenheit. It is necessary therefore in the preparation of a properly brewed beverage tea to maintain the temperature of the hot water above two hundred degrees for a sufficient time period, usually about three minutes, so that the optimum amount of tannin is extracted from the tea leaves and is brought into solution to impart the desired flavor to the resultant beverage.

For many years tea connoisseurs have used a tea cozy in brewing tea in order to secure a beverage having the desired flavor and stimulating effect. Such devices usually have been formed of a fabric material in the form of a blanket or covering which surrounds the tea pot and is placed thereon during the infusion of the essential elements from the tea leaves into the hot water as well as for maintaining a proper temperature level in the pot during this time to assure the optimum infusion into the hot beverage of the water soluble elements from the tea leaves. Such previously known devices usually have been made of spaced layers of cloth or the like in the form of an envelope with the spaces between the cloth layers filled with thermally insulating materials such as, cotton, wool, down, or the like.

Such devices are used in and around food and in areas where food is being cooked or prepared. Such devices thus frequently become contaminated by food elements and in addition to being unsanitary also present an unwholesome appearance. In use such devices also absorb moisture from the steam discharged from the tea pot. Such absorption of moisture by the heat insulating materials reduces their efficiency so that the devices are not as fully effective in use as is desired. Such devices in addition to being relatively costly also present the problem of regular laundering to keep them clean. In each laundering some of the heat insulating materials are certain to become caked leaving air voids and spaces between the particles of the heat insulating material and this results in a further loss in thermal efficiency of the unit.

Due to the relatively high cost of such units it previously has not been practical to provide them on such a basis that they can be readily discarded and new devices used in their place. Also the nature of the materials from which such devices are formed make them a natural source of food contamination due to the unsanitary conditions caused by their use. This to a very large extent has ruled out their use in restaurants and commercial eating establishments where high sanitary standards must be maintained. As a result, the use of such devices have usually been limited to the home and domestic preparation of tea with the result that users frequently have remarked on the real difference in flavor between a well brewed cup of tea in the home and tea as served in the usual restaurant or eating establishment.

It is, therefore, an object of the present invention to provide a thermally insulated tea cozy in the form of an envelope or cover, either for a multi-cup or a single serving tea pot, which is formed of such materials and in such a manner as to permit its use under the most strict sanitary regulations.

A further object of the present invention is to provide a thermally insulated, moisture repellant, relatively inexpensive tea cozy in the form of an envelope or other covering for a tea pot, said envelope or other covering having such thermal insulating properties that when the tea pot is filled with the required amount of tea leaves and brisk boiling water and is placed within the tea cozy, the heat loss from the pot will be reduced and the temperature of the mixture of water and tea leaves in the pot will be held in the general range of approximately 200 degrees Fahrenheit during the critical infusion time of approximately 3 minutes.

Another object of the present invention is to provide a relatively inexpensive tea cozy formed of durable materials which will permit its use for the intended purpose and yet will provide such a device at a sufficiently low cost that it may be readily discarded when its thermal efficiency is impaired or it becomes unsanitary through use.

It is a further object of the present invention to provide a tea cozy which is adapted for use in restaurants and other commercial food handling establishments where tea is served and in which the tea pot will be maintained at a proper temperature to assure both a well prepared cup of tea and a hot cup of tea when consumed in the normal course by the user.

It is a further object of the present invention to provide a tea cozy formed of a moisture repellant, reflective type of thermal insulating material and which is so constructed as to properly insulate a tea pot from rapid heat loss to the surrounding atmosphere and which at the same time will provide an external surface which is attractive in appearance and which may be ornamented in any desired manner and used for the effective display of advertising, directly at the point of consumption.

Other objects of this invention will appear in the following description and appended claim, reference being had to the accompanying drawings forming a part of this specification wherein like reference characters designate corresponding parts in the several views.

In the drawings:

Figure 1 is a perspective view of one embodiment of the invention showing the tea cozy in position to receive a tea pot therein.

Figure 2 is a sectional view taken on line 2—2 in Figure 1.

Figure 3 is a side view of another embodiment of the present invention in which a tea pot is shown in dotted lines.

Figure 4 is a front view of the embodiment shown in Figure 3.

Figure 5 is a sectional view taken on line 5—5 of Figure 3.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the embodiment shown in Figure 1 the envelope there disclosed will be seen to include a housing 1 having a closed end 2 (not shown) and an open end 3, over which there is positioned a flap 4 having an angularly turned portion 5 leading to an integrally formed strip 6 for hingedly mounting said flap on top wall 7 of the housing 1.

The housing and flap are preferably formed of a backing sheet of waterproof paper 8, to the opposite faces of which are secured sheets 9 and 10 of a heat-reflecting metallic material such for example as aluminum. It is contemplated that the backing sheet could be formed of materials other than waterproofed paper and that the cozy could be formed of a reflective metal sheet without any support as long as the metal sheet is of sufficient rigidity to support itself. The use of thin metallized heat-reflecting surfaces as formed by thin metal foils is recommended as it is appreciated that such reflecting sheets are extremely thin to reduce the cost thereof. The heat reflecting sheets can be formed of any desired materials having a reflectivity which is high enough to reflect the heat-rays and also to insulate the covered tea pot sufficiently to maintain the water in the pot above a temperature of approximately two hundred degrees Farenheit for a time period of approximately three minutes.

The wall construction shown in Figure 2 illustrates the wall as formed with one backing sheet 8 and two heat-reflecting sheets 9 and 10. It is contemplated, however that the desired temperature can be maintained with but one reflecting surface. Tests and observations indicate that upwards of fifty percent of the heat loss from the pot is eliminated using the envelope shown in Figures 1 and 2. When only one reflecting sheet is used the heat loss is of course greater, but not high enough to prevent the pot temperature from falling below the desired level for the desired time period.

Referring to the cozy construction shown in Figures 3 through 5, the envelope there illustrated will be seen to include a bottomless housing 15, the walls of which are formed of a backing sheet 16 and a heat-reflecting sheet 17. It is contemplated that the walls could be constructed as shown in Figure 2, in which case the cozy would have greater heat retaining properties.

The housing 15 is conveniently made of a single piece of material by folding the material along line 18 to form side walls 19 and 20, after which the two side walls are secured together by stitchings 21 and 22 or the equivalent thereof. An opening 23 is cut in the material to receive the spout of the tea pot, or may be omitted, if desired.

With either form of tea cozy it will be appreciated that the heat-reflecting insulation incorporated therein will effectively maintain the contents of the tea pot at the desired temperature and for the time period required to assure correct brewing of the tea.

From the foregoing it will be seen that the construction of the tea cozy either in the particular form shown in Fig. 1 or in the form shown in Fig. 3 provides a moisture repellant covering for the tea pot which is spaced from the sides thereof, in such a manner as to provide dead air spaces between the pot and the cozy and which in combination with the reflective surfaces provided in the interior of the cozy provides an effective thermal insulation of the pot reducing the heat loss therefrom to such an extent that a temperature in excess of 200 degrees Fahrenheit will be maintained within the pot for a time period of approximately 3 minutes. Thereafter the cozy will serve to retain the temperature of the brewed tea at progressively lower temperatures but this drop in temperature occurs over a longer period of time than is possible with an exposed tea pot without a cozy or with a cozy which has lost some of its thermal insulation properties by the absorbtion of moisture.

It will be observed also that the construction herein disclosed is such that the entire unit may be readily constructed and supplied at a relatively low cost which will make it possible for such devices to be widely used and to be discarded as soon as they lose their insulating properties or become unsanitary.

Since the materials used in the construction of the tea cozy herein described are moisture repellant it will be seen that thermal insulating properties are not impaired by the absorbtion of moisture from the tea pot, nor are they impaired as is the case with a conventional tea cozy by the repeated launderings which are required to maintain it in a sanitary and wholesome condition. It will be seen also that the tea cozy in the present invention provides a plurality of exposed surfaces which may be ornamented in any desired manner and which may be used for the display of advertising material as desired.

Having thus described the invention, I claim:

A tea cozy comprising a bottomless tent formed as a single upright sheet curved in horizontal directions with its upright end edges secured together and with its top edge portions turned inwardly and secured together so as to closely encircle the side and top surfaces of a tea pot; said sheet being formed of a paper backing layer faced with bright heat-reflective metal foil on both of its surfaces; said sheet being of sufficient strength to sustain the weight of the tent in upright position, and the metal foil following the contour of the backing layer; whereby to provide an economically constructed tea cozy structure for maintaining a pot of initially boiling water and tea leaves at a temperature above 200 degrees Fahrenheit for a period of approximately three minutes after the pot is positioned within the tent; the metal foil on the backing layer surfaces serving to not only reflect heat but also to provide easily cleanable surfaces and to act as moisture barriers for preventing deterioration of the backing layer.

References Cited in the file of this patent

UNITED STATES PATENTS

| | | |
|---|---|---|
| 1,520,122 | Gephart | Dec. 23, 1924 |
| 1,999,670 | Strouse | Apr. 30, 1935 |
| 2,031,254 | Derr | Feb. 18, 1936 |
| 2,189,055 | Cage | Feb. 6, 1940 |
| 2,298,146 | Mersbach | Oct. 6, 1942 |
| 2,331,085 | Sterling | Oct. 5, 1943 |
| 2,353,678 | Lockwood | July 18, 1944 |

FOREIGN PATENTS

| | | |
|---|---|---|
| 425,823 | Great Britain | Mar. 21, 1935 |
| 647,833 | Great Britain | Dec. 20, 1950 |

OTHER REFERENCES

"On Uncle Samis Water Wagon," Moore, pages 3–4.
"Home Made Beverages," Hopkins, page 126.